United States Patent [19]
Hattori

[11] Patent Number: 5,492,475
[45] Date of Patent: Feb. 20, 1996

[54] PLANETARIUM AND PROJECTION APPARATUS FOR SAME

[75] Inventor: Masamitsu Hattori, Aichi, Japan

[73] Assignee: Minolta Camera Kabushiki Kaisha, Osaka, Japan

[21] Appl. No.: 157,393

[22] Filed: Nov. 23, 1993

[30] Foreign Application Priority Data

Nov. 27, 1992 [JP] Japan .................................. 4-318770

[51] Int. Cl.$^6$ ................................................. G09B 27/00
[52] U.S. Cl. ............................................. 434/286; 353/94
[58] Field of Search ..................................... 434/286, 285, 434/284, 289; 353/94

[56] References Cited

U.S. PATENT DOCUMENTS

3,571,954  3/1971  Frank ........................................ 434/286
4,639,224  1/1987  Maejima et al. ........................ 434/286

Primary Examiner—Gene Mancene
Assistant Examiner—Jeffrey A. Smith
Attorney, Agent, or Firm—Willian Brinks Hofer Gilson & Lione

[57] ABSTRACT

A planetarium has a console, a host computer, and a plurality of mutually separate and independent projection apparatus for projecting a star field, the sun, moon and planets. Each projection apparatus incorporating a high performance CPU. Time and date and viewer coordinates inputted by the console are transmitted to the host computer. The host computer computes the Julian calendar date, and transmits the results to a plurality of the high performance CPUs in parallel. Each high performance CPU calculates in parallel data relative to the positional orientation of the projection apparatus which incorporate the high performance CPU in accordance with data transmitted from the host computer. The high performance CPU controls the positional orientation of the corresponding projection apparatus based on the results calculated.

10 Claims, 6 Drawing Sheets

PLANETARIUM AND PROJECTION APPARATUS FOR SAME

BACKGROUND OF THE INVENTION

1. Field of the Invention

The present invention relates to a planetarium and projection apparatus for same, and more specifically relates to a planetarium providing a plurality of separate and independent projection apparatus of star field projection apparatus, planet projection apparatus and the like.

2. Description of the Related Art

Conventional planetariums having a star field projection apparatus and a plurality of mutually separate and independent supplemental projection systems for projecting the sun, moon, and planets are well known. Typically, the projectors of the star field projection apparatus are supported on three to four axes, and the projectors of the supplemental projection apparatus are supported on two axes. In planetariums of the space type, a view of space as perceived from earth can be reproduced by the combined actuation of a plurality of axes. The amount of light emitted by the light source lamps of each of the projectors can be changed to reproduce changes in the luminous intensity of stars. In conventional planetariums, high performance minicomputers and engineering workstations are used as the host computers to control the aforesaid various operations, such that said host computers integratedly control all actuation of the axes of the various projectors, light intensity of the light source lamps and the like.

Figure 1:
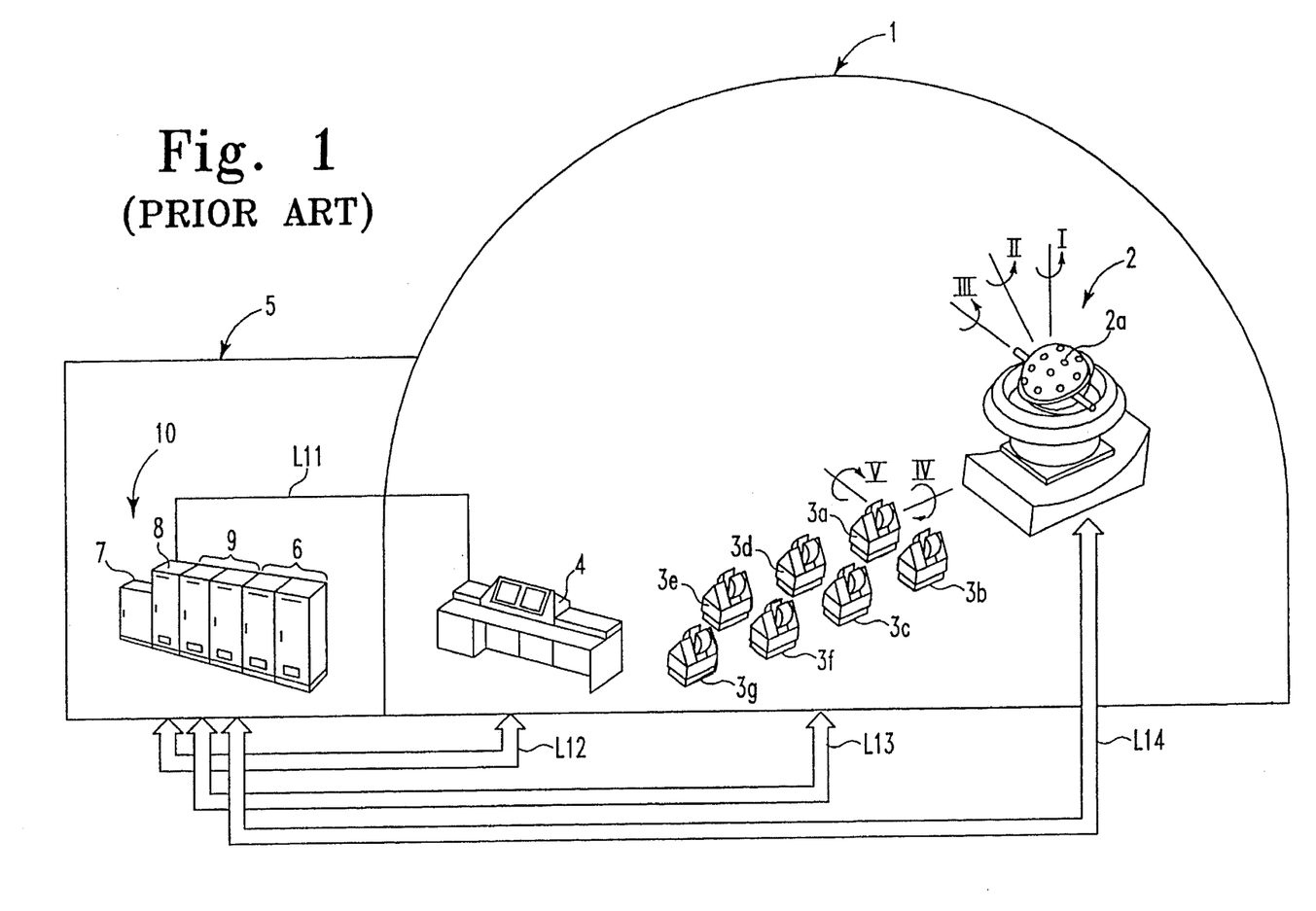
FIG. 1 is an illustration showing the construction of conventional technology relating to the present invention.

FIG. 1 shows the construction of a conventional planetarium. Within a dome 1 are provided a star field projection apparatus 2, supplemental projection apparatus 3a through 3g, and a console 4 to monitor and specify the operation of said projection apparatus. The star field projector bulb 2a of the star field projection apparatus 2 is rotatable around axes I, II, and III, whereas each of the supplemental projections apparatus 3a through 3g are rotatable around axes IV and V. A control unit 10 for controlling the aforesaid devices is installed in a room 5 adjoining the dome 1, and comprises the uninterrupted power supply 7, minicomputer 8 as the host computer, servo-controller 9 for controlling the axis of each projector, and distribution board 6. The control unit 10 and console 4 are connected via a digital signal line L11 and a power line L12 for supplying power to the console 4. The control unit 10 is connected to the star field projection apparatus 2 and supplemental projection apparatus 3a through 3g via the control lines L13 and L14 to supply power to each projector and supply feedback signals from each projector to the control unit 10, respectively.

The aforesaid control unit 10 is necessarily large in order to control the many axes and light source lamps, and a cooling unit must be provided to cool the control unit 10 due to the temperature rise produced by the heat generated by said control unit 10 itself. The cooling unit thus becomes a new source of noise. Conventionally, an air-conditioning unit has been provided in the adjoining room 5 outside the dome 1, and the control unit 10 has been installed in said adjoining room 5. When the control unit 10 is installed outside the dome 1, said control unit 10 and the objects of its control are separated by a distance, such that the cables connecting said control unit 10 and the various objects of its control must be of a length reaching 20 to 30 m. Although FIG. 1 shows only four cables L11 through L14, in actual practice in excess of 100 cables are required. Each of said cables is quite thick and nonflexible due to the necessity of providing various types of shielding for electrical noise. Thus, conventional planetariums must use a large quantity of quite long, expensive cables, which is a source of increased cost, and leads to various disadvantages in the work of installing said cables.

Figure 2:
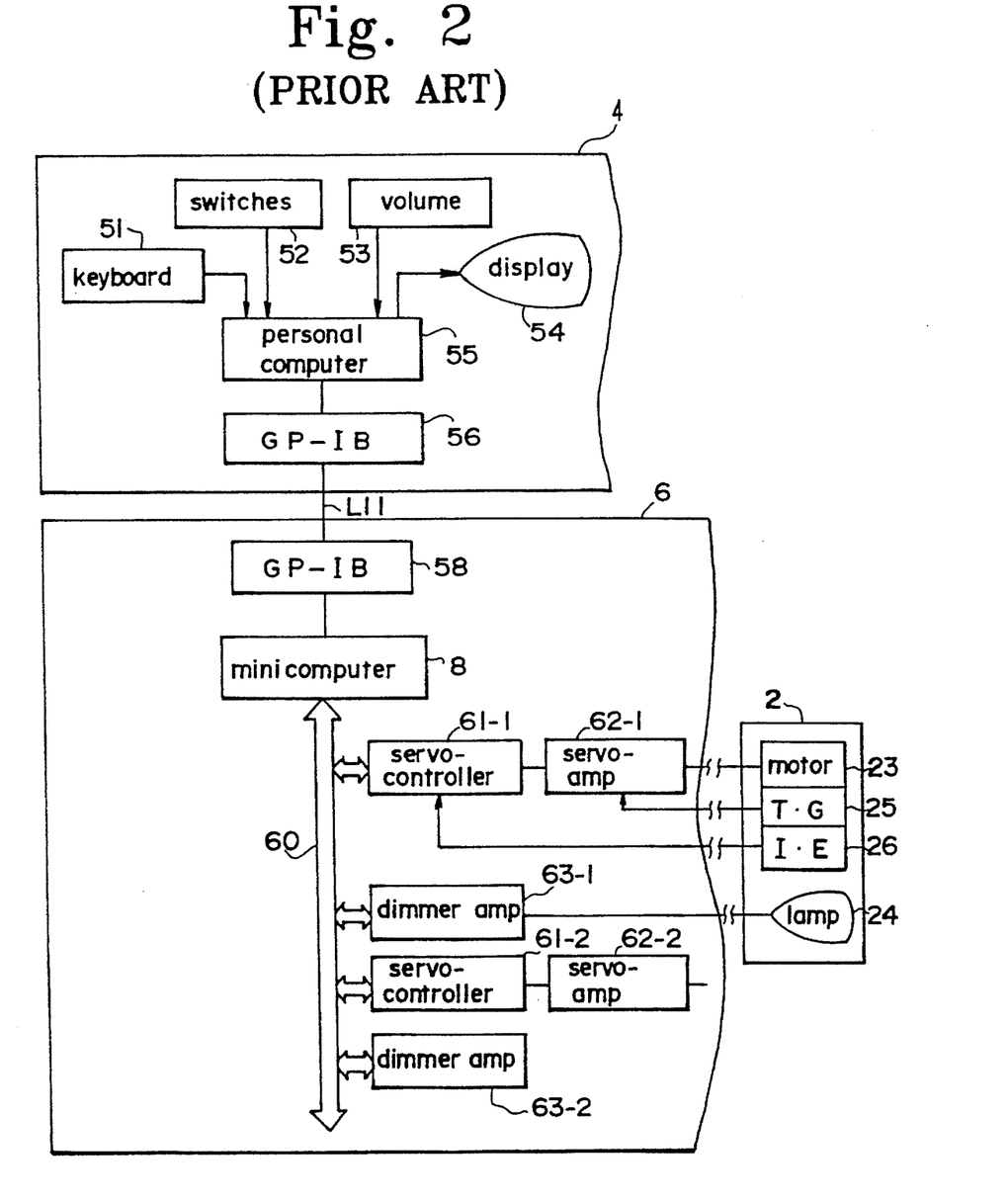
FIG. 2 is a block diagram showing the control circuit of conventional technology relating to the present invention.

FIG. 2 is a block diagram showing the control circuit of a conventional planetarium. A personal computer 55 is built into the console 4. Connected to said personal computer 55 are a keyboard 51, various types of switches 52, data input means such as volume control 53 and the like, and a display unit 54 for displaying various types of information. The personal computer 55 is connected to a minicomputer 8 via the general purpose interface bus (GP-IB) 56, digital signal line L11, and GP-IB 58. A plurality of servo-controllers 61-1, 61-2, ..., and the like and dimmer amplifiers (amps) 63-1, 63-2, ..., and the like provided for each projector are connected to the bus line 60 of the minicomputer 8. The servo-controller 61-1 is connected via the servo-amp 62-1 to the motor 23 for driving axis I of the star field projection apparatus 2. Provided on axis I are a torque generator 25 for detecting the rotational speed of said axis I and, and an incremental encoder 26 for detecting the amount of said rotation. The servo-controller 61-1 and servo-amp 62-1 are provided within the servo-control unit 9.

When the minicomputer 8 computes the coordinate position of axis I, the servo-controller 61-1 controls the servo-amp in accordance with the result of said computation and the feedback signals from the incremental encoder 26. The servo-amp 62-1 outputs power in accordance with the specifications from the servo-controller 61-1 and the feedback signals form the incremental encoder 25 so as to actuate the motor 23. The dimmer amp 63-1 is connected to the light source lamp 24, and outputs power in accordance with the specifications from the minicomputer 8 so as to control the amount of light emitted by said light source lamp 24.

Although the control circuit in FIG. 2 is described using the light source lamp 24 and drive motor 23 of axis I as examples, it is to be noted that in the present embodiment as described above a plurality of axes and light source lamps are the objects of control, such that, in practice, servo-controllers 61 and servo-amps 62 are provided so as to correspond to the number of axes to be controlled a servo-controller 61-2 and a servo-amp 62-2 are also illustrated in FIG. 2, whereas the dimmer amps 63 are provided so as to correspond to the number of light source lamps. Three cables are used for driving the single motor 23, such that the number of cables used in the entire planetarium as described above is estimated to easily exceed 100 cables.

Figure 3:
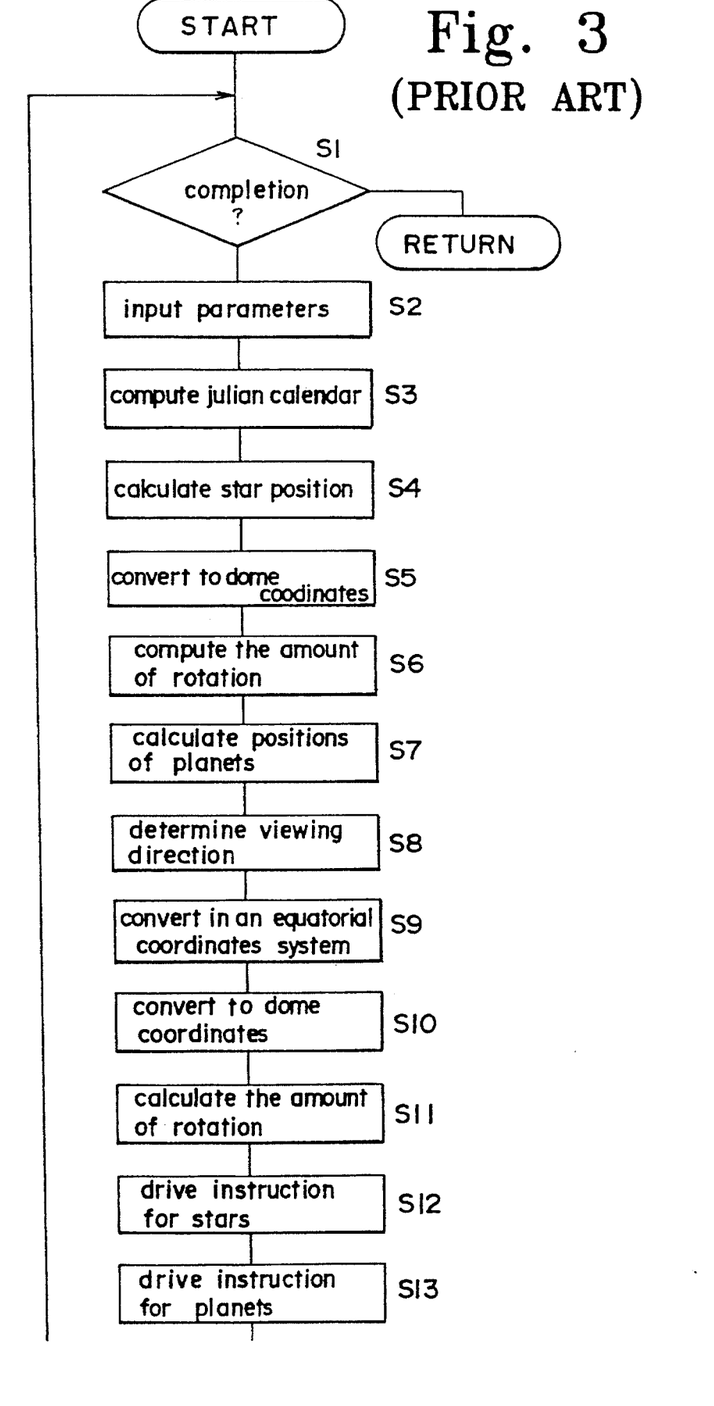
FIG. 3 is a flow chart showing the controls of conventional technology relating to the present invention.

FIG. 3 is a flow chart showing the control of the axes via the minicomputer 8. This routine is called when specified by operators from the console, and when specified during the automated computation program. In step S1, a check is made to determine whether or not all axes have completed movement to their objective positions. When all axes have not completed movement to their objective positions, the processes of step S2 and subsequent steps are executed. In step S2 and thereafter, various parameters such as the performance date, viewer coordinates, drive speed of each axis and the like are input from the personal computer 15 of the console 4, and the date of the performance date according to the Julian calendar is computed (steps S2, S3). Then, the fixed star position is calculated based on the date computed according to the Julian calendar, the results are converted to coordinates on the dome, and the amount of rotation is computed for axes I, II, and III of the star field projection apparatus 2 necessary to project the fixed star at said coordinates (steps S4, S5, S6). In steps S7 through S11, calculations are made to determine the projection positions of the planets. Although this calculation must be executed for each of the planets, which change as sequential objects, so as to be executed seven times in accordance with the number of supplemental projection apparatus 3a through 3g, only a single calculation is shown in the drawing for the sake of simplicity. That is, the coordinates of the planets on the performance date are calculated relative to a solar ecliptic coordinate system (Step S7). Based on the aforesaid calculated coordinates, the planet viewing direction is determined from the input viewer coordinates, and the results are converted to coordinates in an equatorial coordinate system (step S8, S9). Continuing, the aforesaid results are converted to coordinates on the dome, and the amount of rotation is calculated for axes IV and V of the supplemental projection apparatus necessary to project the planet at said coordinates (steps S10, S11). Based on the aforesaid calculation results, motor drive instructions are initiated for each servo-controller 21-1, 21-2, . . . , and the like (steps S12, S13).

In a conventional planetarium as described above, the amount of rotation of all axes of the star fields projection apparatus 2 and the supplemental projection apparatus 3a through 3g are stored in minicomputer 8 and controlled by a single software routine. Although not illustrated in the drawings, the amount of light emitted by all light source lamps are similarly controlled by a single software routine. Thus, the minicomputer 8 alone is responsible for executing many processes, and must execute said many processes at high speed to accomplish a smooth performance. Accordingly, the minicomputer 8 must be a very high performance machine. When a user desires to increase the number of installed supplemental projectors, extensive labor must be expended because a large amount of software stored in the minicomputer 8 must be modified in accordance with said desires, with the result that the user's desires cannot be adequately addressed.

SUMMARY OF THE INVENTION

A main object of the present invention is to provide a planetarium wherein the cables required to mutually connect the projectors may be short.

A further object of the present invention is to provide a planetarium wherein the number of projectors may be readily increases or decreased.

These and other objects of the invention are accomplished by providing a planetarium having a dome, input means for inputting time and date and viewer coordinates, host computer for calculating the date according to the Julian calendar corresponding to the date and time input via said input means, star field projection apparatus for projecting a star field on said dome, and a plurality of supplemental projectors for projecting planets and the like on said dome;

said star field projection apparatus incorporating a first computing means for calculating data relative to the positional orientation of the star field projection apparatus based on said Julian calendar date and said viewer coordinates, and first control means for controlling the positional orientation of said star field projection apparatus based on the results calculated by said first computing means;

said supplemental projection apparatus incorporating a second computing means for calculating data relative to the positional orientation of said supplemental projection apparatus based on said Julian calendar date and said viewer coordinates, and second control means for controlling the positional orientation of said supplemental projection apparatus based on the results calculated by said second computing means.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

Figure 5:
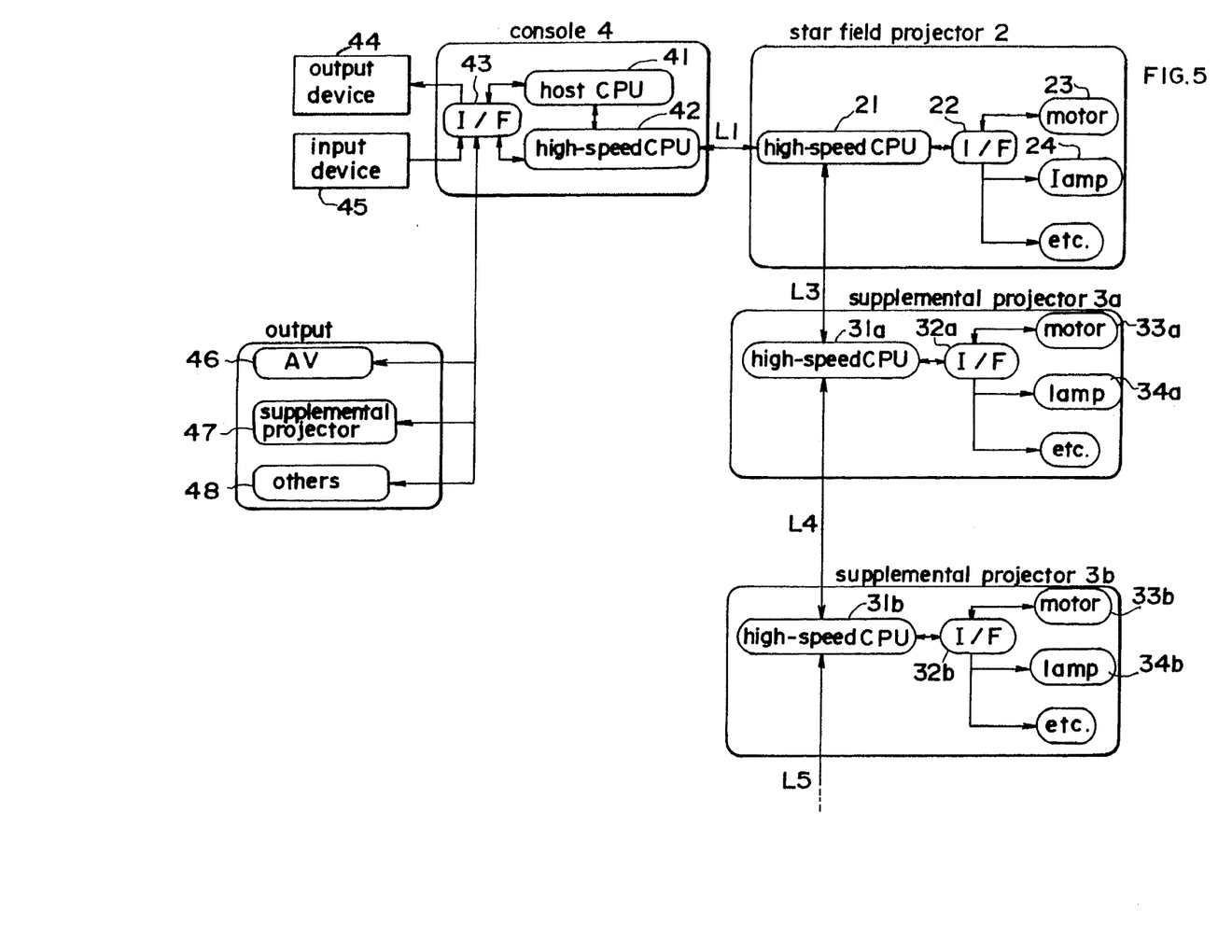
FIG. 5 is a block diagram showing a control circuit of the planetarium of the present invention.
Figure 6:
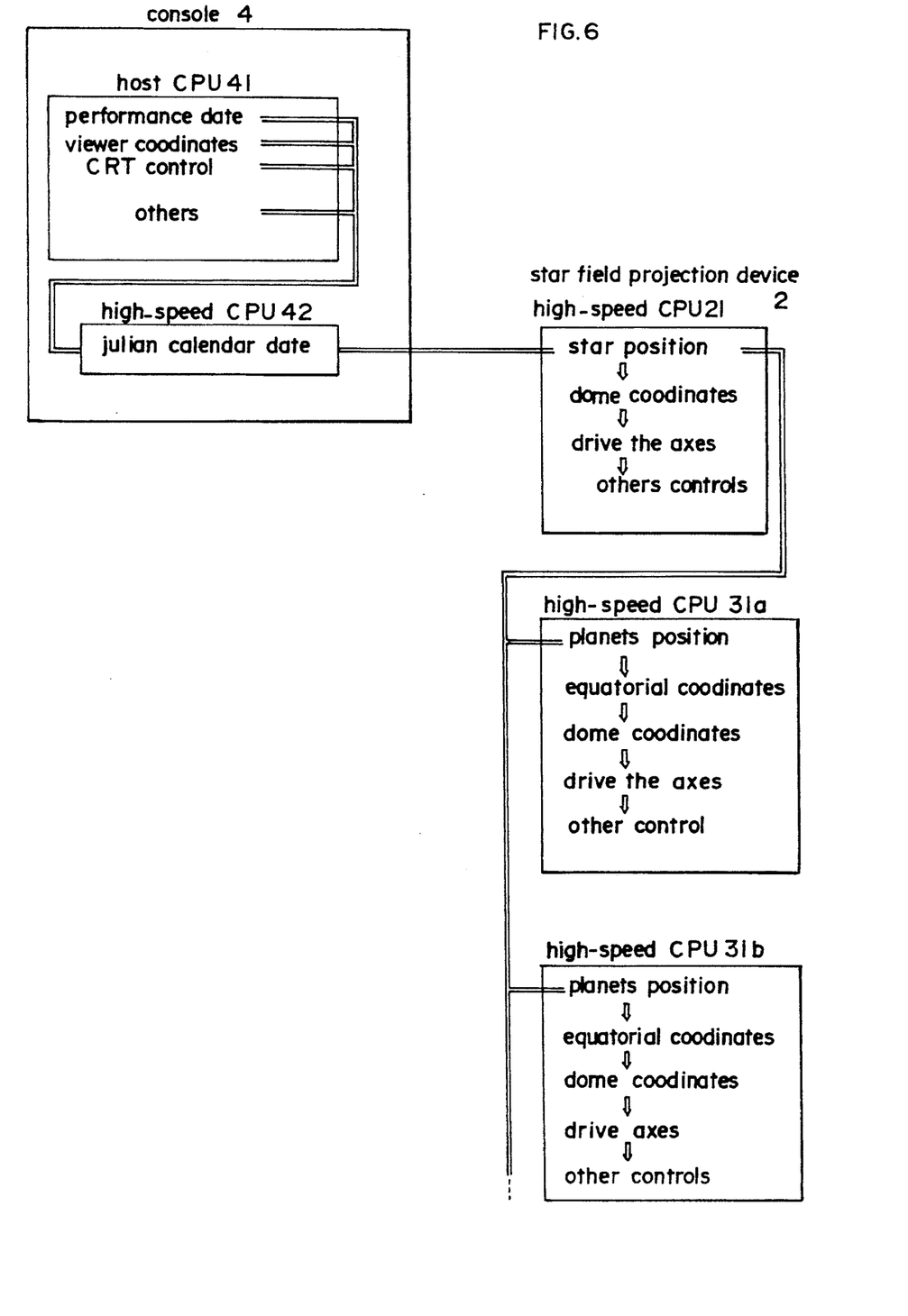
FIG. 6 is a flow chart showing the controls of an embodiment of the planetarium of the present invention.

The preferred embodiments of the planetarium of the present invention are described hereinafter with reference to FIGS. 4, 5 and 6. Parts in the drawings common to parts shown in FIGS. 1, 2 and 3 are designated by like reference numbers throughout the several drawings.

Figure 4:
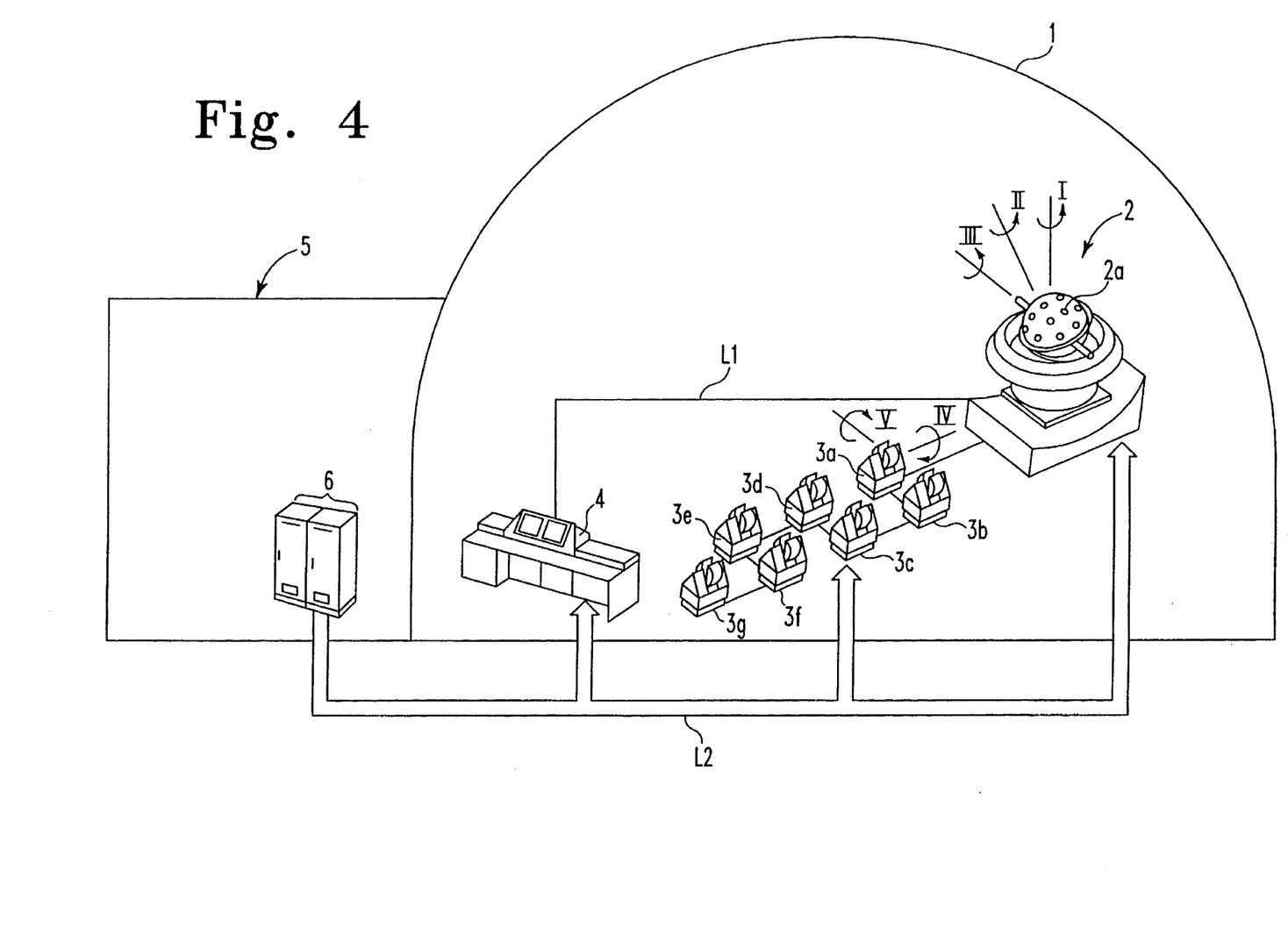
FIG. 4 is an illustration showing the construction of a planetarium of the present invention.

FIG. 4 shows the construction of the planetarium of the present invention. Installed in the room 5 adjoining the dome 1 is only a distribution board 6, not a minicomputer or servo-control unit. The distribution board 6, star field projection apparatus 2 and supplemental projectors 3a through 3g, and console 4 are connected only by a power line L2 which supplies power thereto. The projection apparatus 2 and supplemental projectors 3a through 3g have built-in control units, as described later. A digital signal line L1 connects the console 4 to the star field projection apparatus 2, and sequential digital signal lines connect the star field projection apparatus 2 to each supplemental projector 3a through 3g.

The control circuit of the present invention is described hereinafter with reference to FIG. 5. A host computer 41 and high-speed operation central processing unit (CPU) 42 are built into the console 4 as a control unit. The high-speed operation CPU 42 performs numerical calculations at high speed; a transputer (Inmost International Public Ltd., Co.) is used. The host computer 41 and the high-speed operation CPU 42 are connected to the input device 45 for the keyboard and the like, and output device 44 for the CRT and the like on the console 4 via the interface 43. Connected to the interface 43 are various components outside the console 4, e.g., AV device 46, various supplemental projectors 47 and the like (others of such components are generally designated as "others" 48 in FIG. 5). According to the aforesaid construction, the host CPU 41 controls the output device 44, AV device 46 and supplemental projectors 47, and specifies the calculations to the high-speed operation CPU 42 based on the data input from the input device 45. The high-speed operation CPU 42 is connected to the high-speed operation CPU 21 built into the star field projection apparatus 2 via the previously mentioned digital signal line L1.

The high-speed operation CPU 21 of the star field projection apparatus 2 is connected to the motor 23, light source lamp 24 and the like via the interface 22, and controls the aforesaid various components in based on it's calculation results. Similarly, various high-speed operation CPUs 31a through 31g are provided in the supplemental projectors 3a through 3g, said high-speed operation CPUs 31a through 31g respectively control the motors 33a through 33g, and light source lamps 34a through 34g via the respective interfaces 32a through 32g. The high-speed operation CPUs 31a through 31g of the supplemental projectors 3a through 3g are sequentially connected by means of the digital signal lines L3, L4, . . . , from the high-speed operation CPU 21 of the star field projection apparatus 2.

The controls accomplished in the previously described construction are briefly described hereinafter with reference to FIG. 6. When the performance date and time and viewer coordinates are input to the host computer 41 of the console 4, said data are transmitted to the high-performance CPU 42. The high-performance CPU 42 calculates the date according to the Julian calendar corresponding to the input performance date and time. When the high-performance CPU 42 calculates the Julian calendar date, said calculated date according to the Julian calendar and the aforesaid viewer coordinates are input to the high-performance CPU 21 of the star field projection apparatus 2, and said high-performance CPU 21 calculates the fixed star position based on said data. When the high-performance CPU 21 completes the fixed star position calculation, the data relating to the equinox conversion, Julian date, and viewer coordinates are transmitted to the high-performance CPUs 31a through 31g of each supplemental projector 3a through 3g. Thereafter, the high-performance CPU 21 of the star field projection apparatus 2 converts the fixed star position obtained in the previous calculation into coordinates on the dome 1. The actuation of each axes I, II and II, and the amount of light emitted by the light source lamps 24 are controlled in accordance with the aforesaid calculation results.

On the other hand, when the high-performance CPUs 31a through 31g of the supplemental projectors 3a through 3g respectively receive independently of one another the input data relating to the equinox conversion, Julian date and viewer coordinates from the high-performance CPU 21 of the star field projection apparatus 2, controls are subsequently executed. That is, the high-performance CPUs 31a through 31g respectively calculate the positions of the pertinent planets, drive the axes IV and V of the pertinent supplemental projectors, and control the amount of light emitted from the light source lamps.

As described above, in the present embodiment, the power line L1 is the only long cable extending from within the dome to the adjoining room 5. Moreover, since single cables alone may be used for communications between each projector and comparable high-performance CPUs, the number of cables used throughout the planetarium is greatly reduced, and the total extension length of said cables is rendered shorter.

The high-speed operation CPUs 31a through 31g of the respective supplemental projectors 3a through 3g receive simultaneously the calculation results output from the high-performance CPU 21 of the star field projection apparatus 2, and thereafter process said data independently of one another. Therefore, a number of additional supplemental projectors may be optionally added without software modification.

In the aforesaid embodiment, the high-performance CPUs 31a through 31g of the supplemental projectors 3a through 3g begin calculations upon receipt of the calculation results from the high-performance CPU 21 of the star field projection apparatus 2, because the said high-performance CPUs 31a through 31g use the data relating to the calculated equinox conversion in calculating planetary positions. However, calculation of the planetary positions are possible if the Julian date and viewer coordinates are known. Accordingly, insofar as the high-performance CPU 21 and high-performance CPUs 31a through 31g untiringly perform duplicate identical calculations, data may be input simultaneously from the high-speed operation CPU 42 of the console 4 to the high-performance CPU 21 and high-performance CPUs 31a through 31g so as to allow said high-performance CPU 21 and high-performance CPUs 31a through 31g to perform parallel processing.

Although the present embodiment has been described as providing a control means for the star field projection apparatus 2 and the supplemental projectors 31a through 31g, it is to be noted that similar effectiveness may be achieved by providing a control means for the supplemental projectors such as a pointer, constellation map projector and the like.

Although the present invention has been fully described by way of examples with reference to the accompanying drawings, it is to be noted that various changes and modifications will be apparent to these skilled in the art. Therefore, unless otherwise such changes and modifications depart from the scope of the invention, they should be construed as being included therein.

What is claimed is:

1. A planetarium comprising:

a dome;

a plurality of mutually separate and independent projection apparatus for projecting stars on said dome;

a plurality of projection apparatus computer control devices, each of said plurality of projection apparatus computer control devices being provided in a respective one of said plurality of projection apparatus for controlling its respective projection apparatus;

a host computer; and means for connecting said host computer to each of said plurality of projection apparatus computer control devices, wherein said plurality of projecting apparatus computer control devices operate in parallel to control their respective projection apparatus in accordance with the control of said host computer.

2. A planetarium according to claim 1, further comprising input means for inputting time and date to said host computer, and wherein said host computer calculates the Julian calendar date corresponding to the date and time input thereto via said input means and transmits the calculated Julian calendar date to said plurality of projection apparatus computer control devices in parallel.

3. A planetarium according to claim 2, wherein each of said plurality of projection apparatus computer control devices controls the positional orientation of its respective projection apparatus based on the Julian calendar date transmitted from said host computer.

4. A planetarium according to claim 1, wherein said host computer is disposed in said dome.

5. A projection device for use in a planetarium having a plurality of projection apparatus, said projection device comprising an independent unit which includes:

a projector for projecting a star or other body;

an axis for rotatably supporting said projector;

drive means for rotating said axis; and a controller for said projection device which is built into said projection device, said controller comprising:

computing means for calculating data relating to an amount of rotation of said axis in accordance with inputted date; and control means connecting said computing means to said drive means for controlling said drive means to rotate said axis based on the data calculated by said computing means.

6. A projection device according to claim 5, wherein said projector projects one planet.

7. A planetarium comprising:

a dome, a host computer, input means for inputting time and date data and viewer coordinates data to said host computer, said host computer calculating a date according to the Julian calendar corresponding to the date and time data input via said input means, a star field projection apparatus for projecting a star field on said dome, and a plurality of supplemental projectors for projecting planets and the like on said dome, wherein said star field projection apparatus incorporates a first computing means connected to said host computer for calculating data relative to a positional orientation of the star field projection apparatus based on said Julian calendar date and said viewer coordinates data from said host computer, and first control means connected to said first computing means for controlling a positional orientation of said star field projection apparatus based on the data calculated by said first computing means; and wherein each of said plurality of supplemental projectors incorporates a second computing means connected to said host computer, each of said plurality of second computing means being built-in to a respective one of said plurality of supplemental projectors for calculating data relative to the positional orientation of its respective supplemental projector based on said Julian calendar date and said viewer coordinates data from said host computer, and a second control means connected to each of said second computing means for controlling a positional orientation of its respective supplemental projector based on the data calculated by said second computing means.

8. A planetarium according to claim 7, wherein said first computing means calculates data relating to an equinox conversion.

9. A planetarium according to claim 8, wherein said first computing means transmits the data relating to the equinox conversion to said second computing means; and said second computing means controls said second control means to control said plurality of supplemental projectors in accordance with the data relating to the equinox conversion transmitted from said first computing means.

10. A planetarium according to claim 7, wherein said first computing means is disposed in said dome.

* * * * *